United States Patent
Hanson et al.

(10) Patent No.: US 10,397,071 B2
(45) Date of Patent: Aug. 27, 2019

(54) AUTOMATED DEPLOYMENT OF CLOUD-HOSTED, DISTRIBUTED NETWORK MONITORING AGENTS

(71) Applicant: AirMagnet, Inc., Santa Clara, CA (US)

(72) Inventors: Cody Hanson, Colorado Springs, CO (US); Brandon Shannon, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 269 days.

(21) Appl. No.: 14/988,409

(22) Filed: Jan. 5, 2016

(65) Prior Publication Data

US 2017/0195192 A1    Jul. 6, 2017

(51) Int. Cl.
*H04L 12/24*    (2006.01)
*H04L 12/26*    (2006.01)

(52) U.S. Cl.
CPC ...... *H04L 41/5054* (2013.01); *H04L 43/0876* (2013.01)

(58) Field of Classification Search
CPC .............. H04L 41/5054; H04L 43/0876
See application file for complete search history.

(56) References Cited

U.S. PATENT DOCUMENTS

| | | | | |
|---|---|---|---|---|
| 6,675,308 B1 * | 1/2004 | Thomsen | ............ | H04L 41/0803 713/100 |
| 7,181,739 B1 * | 2/2007 | Harral | ....................... | G06F 8/61 717/170 |
| 7,197,562 B2 * | 3/2007 | Murtha | ................. | H04L 67/125 709/217 |
| 7,346,679 B2 * | 3/2008 | Padmanabhan | ..... | H04L 12/2854 370/236.1 |
| 8,798,598 B2 * | 8/2014 | Rossmann | .............. | H04W 4/00 455/414.2 |
| 8,892,705 B2 * | 11/2014 | Akamatsu | ............... | H04L 41/00 709/220 |
| 9,077,611 B2 * | 7/2015 | Cordray | .............. | H04L 41/0213 |
| 2002/0194319 A1 * | 12/2002 | Ritche | ................. | H04L 41/0631 709/223 |
| 2004/0162626 A1 * | 8/2004 | Farchmin | ........... | G05B 19/4188 700/96 |

(Continued)

*Primary Examiner* — Uzma Alam
(74) *Attorney, Agent, or Firm* — Locke Lord LLP; Scott D. Wofsy; Christopher J. Capelli

(57) ABSTRACT

A system and method is provided for deploying a network monitoring agent to monitor a network. The method includes receiving a deployment request to deploy a monitoring agent, the monitoring agent including first executable instructions to monitor the network, the request specifying a region external from the network in which to deploy the monitoring agent. The method further includes installing the monitoring agent for execution within a controlled runtime environment on a host machine, the host machine operating in the specified region and having a single operating system. The monitoring agent is executed within the controlled runtime environment to monitor the network from an external perspective of the network. In the controlled runtime environment, during execution of the monitoring agent, all areas of the operating system that are writable by the monitoring agent are isolated from areas of the operating system that are writable by any other software application using the operating system.

8 Claims, 4 Drawing Sheets

(56) References Cited

U.S. PATENT DOCUMENTS

| | | | |
|---|---|---|---|
| 2008/0319567 A1* | 12/2008 | Farchmin | G05B 19/4188 700/99 |
| 2009/0049443 A1* | 2/2009 | Powers | G06F 9/505 718/100 |
| 2010/0185711 A1* | 7/2010 | Subramaniam | A61B 5/0002 340/286.07 |
| 2011/0231555 A1* | 9/2011 | Ebrahimi | H04L 63/102 709/226 |
| 2011/0283017 A1* | 11/2011 | Alkhatib | H04L 12/4641 709/244 |
| 2013/0070761 A1* | 3/2013 | Kamble | H04L 49/253 370/389 |
| 2014/0266592 A1* | 9/2014 | Dahl | H04W 88/16 340/5.71 |
| 2014/0280914 A1* | 9/2014 | Weinberg | H04L 43/0876 709/224 |
| 2016/0359981 A1* | 12/2016 | Ulatoski | H04L 63/08 |
| 2017/0228539 A1* | 8/2017 | Nagafuchi | G06F 13/00 |

* cited by examiner

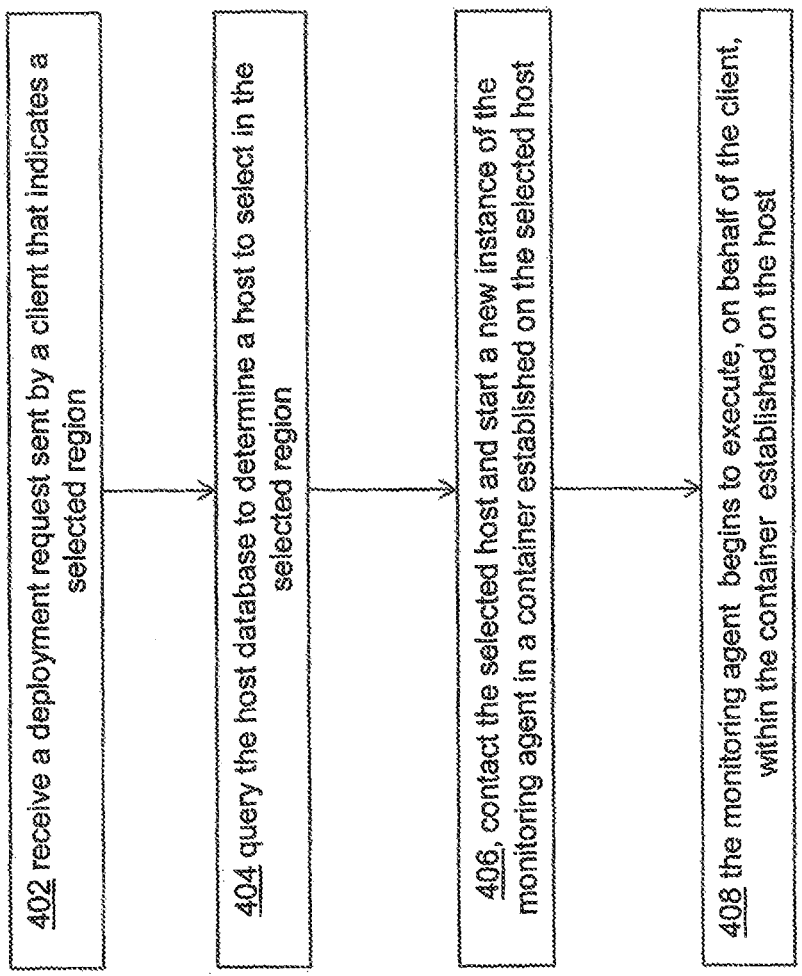

US 10,397,071 B2

AUTOMATED DEPLOYMENT OF CLOUD-HOSTED, DISTRIBUTED NETWORK MONITORING AGENTS

FIELD OF THE INVENTION

The disclosed embodiments generally relate to a system and method for deploying network monitoring agents. In particular, the disclosed embodiments relate to a system and method for deployment of network monitoring agents at selectable distributed locations using a centralized system for multi-tenant deployment.

BACKGROUND OF THE INVENTION

A network monitoring agent is a software program that can observe, measure, report, and/or analyze characteristics of a network and/or the network's component. Network monitoring agents can be deployed using multitenant software.

In one approach using multitenant software, each network monitoring agent is deployed as a separate virtual machine. However, virtual machines use large amounts of memory, including both random access memory (RAM) and disk space. The individual virtual machines need to be separately managed and maintained (e.g., with system and security updates, software licensing, etc.), which can be costly and burdensome to resources.

In another approach using multitenant software, multiple network monitoring agents are executed by the same machine (virtual or real), without (or with limited) isolation. Although this approach can provide greater efficiency than using separate virtual machines for each network monitoring agent, privacy and security risks result from the lack of isolation. Design of the network monitoring agents becomes complicated in the face of such privacy and security risks. In addition, if a network monitoring agent needs root privileges of a machine on which it is deployed in order to execute and perform its tasks, security can be further compromised in view of other software agents executing on the same machine. The network monitoring agent would then be at risk of malicious actions caused by these other software agents, whether intentional or not.

In addition to the above challenges, procurement of computer resources at distributed locations can be time consuming and costly, particularly when the locations are different geographic locations around the world.

Accordingly, there is a need for a system and method to overcome the aforementioned challenges.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a system for deploying a network monitoring agent to monitor a network. The system includes at least one first processing device configured to receive a deployment request to deploy a monitoring agent, wherein the monitoring agent includes first executable instructions to monitor the network. The request specifies a region external from the network in which to deploy the monitoring agent. The at least one first processing device can install the monitoring agent for execution within a controlled runtime environment on a host machine. The host machine operating in the specified region has second executable instructions, including a single operating system, that are executed by a second processing device. The second processing device executes the monitoring agent within the controlled runtime environment to monitor the network from an external perspective of the network. In the controlled runtime environment, during execution of the monitoring agent, all areas of the operating system that are writable by the monitoring agent are isolated from areas of the operating system that are writable by any other software application being executed by the second processing device using the operating system.

In a further aspect of the disclosure, a host machine for hosting a network monitoring agent is provided that monitors a network. The host machine includes a processing device and a memory. The memory stores first programmable instructions, including a single operating system, that are executed by the processing device. The memory further stores a monitoring agent including second programmable instructions that are installed for execution on the host machine within a controlled runtime environment. The processing device executes the monitoring agent within the controlled runtime environment to monitor the network from an external perspective of the network. In the controlled runtime environment, during execution of the monitoring agent, all areas of the operating system that are writable by the monitoring agent are isolated from areas of the operating system that are writable by any other software application being executed by the processing device using the operating system.

In still a further aspect of the disclosure, a method of deploying a network monitoring agent to monitor a network is provided. The method includes receiving a deployment request to deploy a monitoring agent, the monitoring agent including first executable instructions to monitor the network, the request specifying a region external from the network in which to deploy the monitoring agent. The method further includes installing the monitoring agent for execution within a controlled runtime environment on a host machine, the host machine operating in the specified region and having a single operating system. The monitoring agent is executed within the controlled runtime environment to monitor the network from an external perspective of the network, wherein in the controlled runtime environment, during execution of the monitoring agent, all areas of the operating system that are writable by the monitoring agent are isolated from areas of the operating system that are writable by any other software application being executed using the operating system.

BRIEF DESCRIPTION OF THE DRAWINGS

The accompanying appendices and/or drawings illustrate various non-limiting, example, inventive aspects in accordance with the present disclosure;

FIG. 4 illustrates a flowchart illustrating an example method for deployment of network monitoring agents at selectable distributed locations using a centralized system for multi-tenant deployment.

DETAILED DESCRIPTION OF CERTAIN EMBODIMENTS

Figure 1:
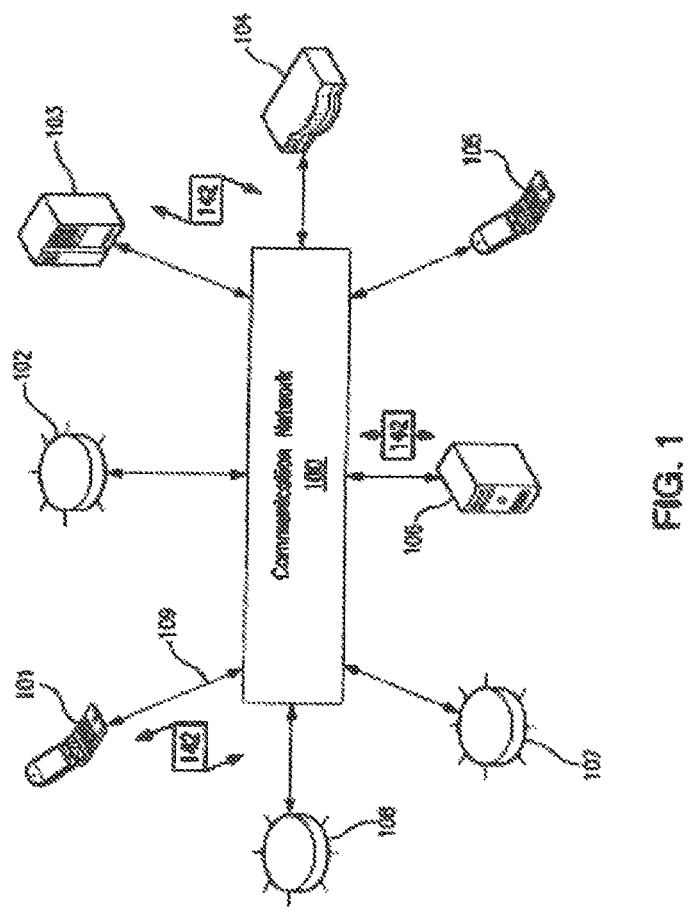
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, and others.

FIG. 1 is a schematic block diagram of an example communication network 100 illustratively comprising nodes/devices 101-108 (e.g., sensors 102, client computing devices 103, smart phone devices 105, servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the communication network, and that the view shown herein is for simplicity. Also, while the embodiments are shown herein with reference to a general network cloud, the description herein is not so limited, and may be applied to networks that are hard-wired.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
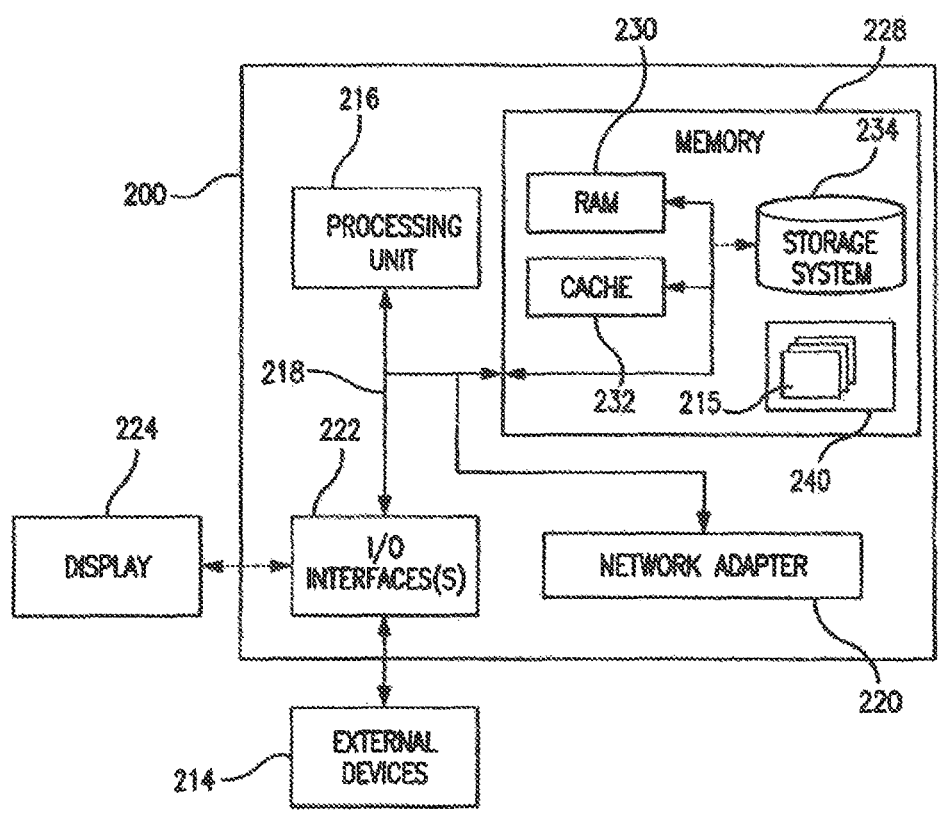
FIG. 2 illustrates an example network device/node.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present disclosure. Device 200 is only one example of a suitable system and is not intended to suggest any limitation as to the scope of use or functionality of embodiments of the disclosure described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the disclosure.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the disclosure as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

In the description that follows, certain embodiments may be described with reference to acts and symbolic representations of operations that are performed by one or more computing devices, such as the computing system environment 200 of FIG. 2. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIGS. 1 and 2 are intended to provide a brief, general description of an illustrative and/or suitable exemplary environment in which embodiments of the below described present disclosure may be implemented. FIGS. 1 and 2 are exemplary of a suitable environment and are not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
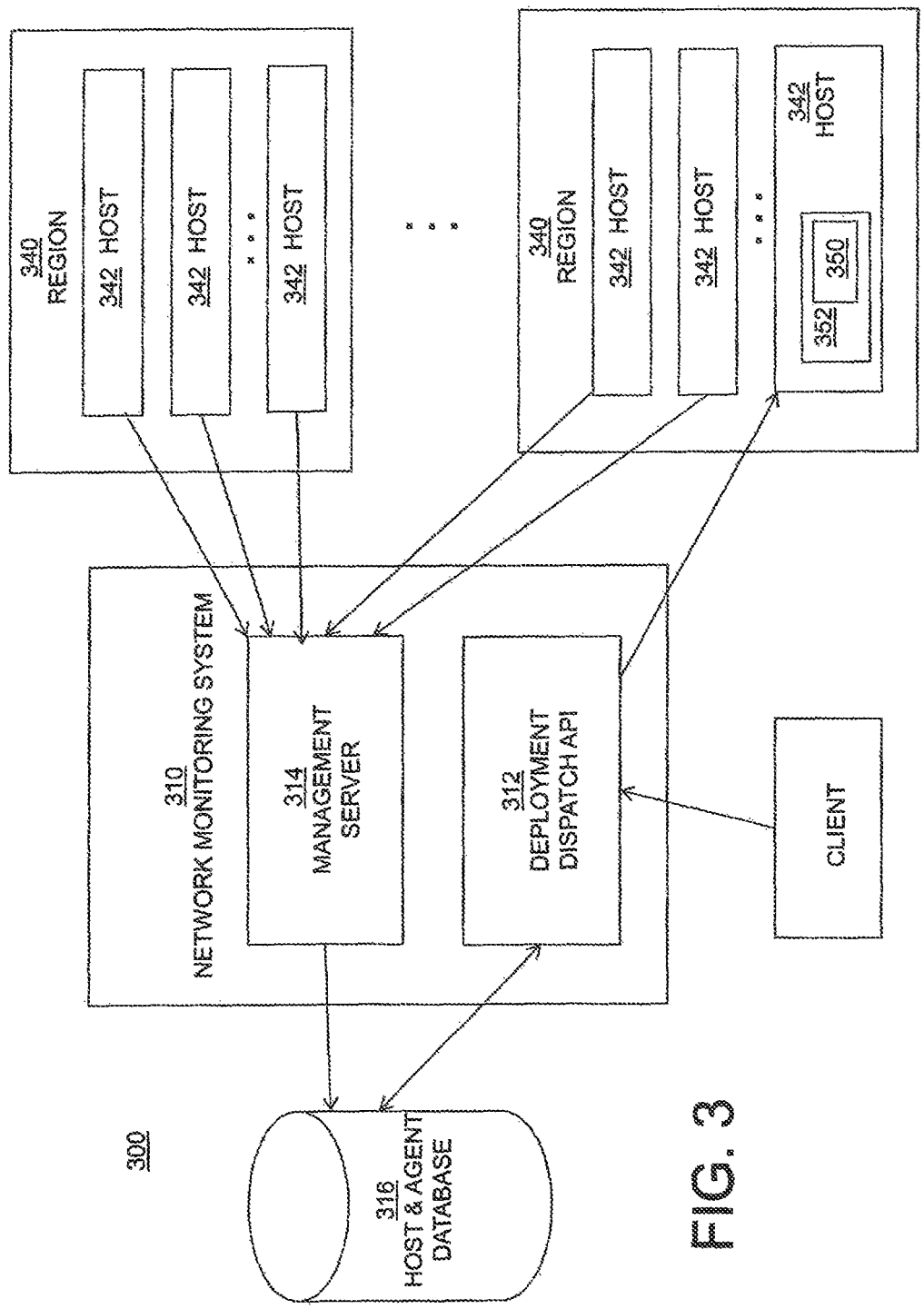
FIG. 3 illustrates a schematic diagram of an example centralized network monitoring agent multi-tenant deployment system.

With the exemplary communication network 100 (FIG. 1) and computing device 200 (FIG. 2) being generally shown and discussed above, description of certain illustrated embodiments of the present disclosure will now be provided. With reference now to FIGS. 3 and 4, a network monitoring system 300 includes a monitoring management system 310 that receives requests from a client 320 to deploy a monitoring agent 350 in a requested deployment region 340. The network monitoring system 300 further includes a host and agent database 316 that stores identification of regions 340 and hosts 342, and can further store one or more versions of monitoring agent 350. In response to the request, the monitoring agent 350 is deployed on a host 342 that is associated with the requested deployment region 340. The host 342 can accommodate multiple tenants. More specifically, the monitoring agent 350 is deployed so that it will be executed in a controlled runtime environment on the host 342, even with multi-tenants. The controlled runtime environment can be provided by, for example, by a container 352. Deployment as referred to herein refers to installing for execution by the associated computing device. Once deployed on the host 342, monitoring agent 342 can access a network, or portion of the network, to be monitored.

The monitoring management system 310, client 320, and hosts 342 can each include one or more computing devices, similar to computing device 200 as shown in FIG. 2. The network being monitored can be a data network similar to communication network 100 or a cellular network, etc.

The monitoring agent 350 is a software component that includes a series of executable programmable software instructions that are configured to perform one or more network monitoring tasks, such as measuring network activity, and reports measurement data to the client 320. The monitoring agent 350 is executed by a processing device of a host 342 at which it is deployed, using an operating system of the host 342. Once disposed on the host 342, the monitoring agent 350 can access the network of interest from an external vantage point relative to the network.

One or more monitoring agents 350 deployed on a host 342 share an internal network with the host 342. The internal network has access to a main network interface that interfaces the host 342 to a main network that the host 342 communicates with. The main network has outbound access to the rest of the Internet from its location in the associated region 340. The monitoring agent 350 can access the main network via the internal internet, and the Internet via the main network.

The monitoring agent 350 can measure properties associated with the network and output measurement data, also referred to as metrics. Examples of metrics that can be accessed include, for example, the host's 342 log files, hardware and processes executed by the host 342, and output measurement data. The monitoring agent 350 can report the metrics at predefined intervals to the monitoring management system 310, in accordance with rules defined by the monitoring agent 350 or monitoring management system 310, or upon request from the monitoring management system 310. For example, the monitoring agent 350 can generate alerts if a metric exceeds a predefined threshold.

In embodiments, the monitoring agent 350 can automatically, or upon command, perform actions in association with the network, instead of, or in addition to network monitoring, such as network related recovery tasks, maintenance tasks, or adjustment tasks. A recovery task can include, for example, restoring a processing device to a previous state, rerouting data to avoid a disabled processor, etc. A maintenance task can include, for example, backing up data, automatic updating, etc. An adjustment task can include, for example, adjustment of virtual capacity to account for fluctuating network demand, or adjust log file volume by compressing and/or archiving log files of the log directory when the log directory exceeds a set capacity threshold and then create a new set of log files to increase capacity. Each of the hosts 342 can be a real or virtual server, e.g., similar to server 106 of FIG. 1, that is able to run many controlled runtime environments simultaneously in a multi-tenancy configuration. Each host 342 can include or use memory, e.g., similar to memory 228, and one or more processing devices, e.g., similar to processing unit 216 of FIG. 2, or a portion of a processing device. The host's memory can store the single operating system that is executed by the host's processing device(s). Unlike different virtual machines that use multiple respective operating systems, the multiple controlled runtime environments executing at the same time on a host 342 use a single operating system.

The term "runtime environment" of the monitoring agent 350 refers to resources available to the monitoring agent 350 while the monitoring agent 350 is executing. The runtime environment of an application, such as the monitoring agent 350, can include software components (e.g., programs, modules, routines) that depend on the application for their execution, and software components that are needed to execute the application (e.g., libraries and configuration files). By installing the monitoring agent 350 into a runtime environment that is controlled within a host 342, the monitoring agent 350 can execute on the host 342 regardless of underlying infrastructure or the operating system distribution used.

The controlled runtime environment can be provided by a container 352. The container 352 can be a private container or a public container, e.g., a cloud-based container, such as a container provided by the DOCKER® Project, e.g., LINUX® Container. Each container 352 can share the operating system kernel with other containers 352. Each portion of the operating system that is shared between containers 352 is read only. Each container can have its own mount, wherein the mount provides a way to access the container 352 for writing.

The client 320 can be a computing device, e.g., similar to devices 101, 103, 105 of FIG. 1. The client 320 can be operated by a user to submit a deployment request to the monitoring management system 310 to request deployment of a monitoring agent 350. The request can indicate a specific network associated with a region 340, a specific region 340 selected from a plurality of regions 340 in which to deploy the monitoring agent 350, a portion of the network to be monitored, monitoring tasks, responses to results of monitoring tasks. Optionally, the request can also specify a version of the monitoring agent, if different versions are available. The region can be external from the network to be monitored in order to obtain a perspective of the network from an external location. "External" from the network is defined herein hosting as not included within the network. A region 340 can be associated with, for example, a certain data center location (e.g., physical or virtual location), a certain cloud provider, or a certain part of a particular network. A region 340 can represent a grouping of host machines 342 that have similar properties associated with network monitoring.

The monitoring management system 310 can receive and process the deployment request by selecting a host 342 from a plurality of hosts 342 within the region 340 indicated by the deployment request. Once a host 342 is selected, the deployment dispatcher 312 deploys the monitoring agent 350 on the host 342. The deployment includes storing a copy of the monitoring agent 350 on the host 342 as a software application to operate within a container 352 deployed on the selected host 342. The container 352 and the monitoring agent 350 are each executed by the host's processing device using the host's operating system. In embodiments, the container 352 can be started, stopped, and/or moved, together with the associated monitoring agent 350, from one host 342 to another host 342.

The container 352 isolates the monitoring agent 350 from other software applications executed by the host's processing device. Isolation of software applications (e.g., monitoring agent 350 or other software application) executed by the host 342 as used herein refers to each software application having exclusive use of or access to resources (e.g., a file system, operating system, list of processes, list of users or groups, installed software packages, software libraries, contents in RAM of the host 342. These other software applications can be contained by different respective containers 352 during execution. Software executing within one container 352 is contained within its own environment and is not affected by a software application executing in another container 352 on the same host 342. The monitoring agent 350, including its usage of the operating system, is isolated relative to other software applications executing on the host 342. Moreover, the deployed monitoring agent 350 can access root privileges available on its host 342 in isolation from other software applications executing on the host 342.

In embodiments, isolation between a monitoring agent 350 and other software applications can be provided using fine grained permission specific to respective resources on a shared host. A root user (also known as a super user), however, for whom permissions do not apply, may still have unrestricted access to these resources.

This isolation of software applications during execution provides secure, exclusive use of resources of the host 342 in which an isolated monitoring agent 350 does not share the resources with software applications that are executing on the host 432. In an embodiment, the isolated monitoring agent 350 shares access to resources of the host 432, such as processing time, total RAM, disk space, and network capacity of the host machine, with other software applications that are deposed inside respective other containers 352, so that the isolated monitoring agent 350 is not affected by processing performed by the other software applications. In embodiments or scenarios, at least some of the resources are shared based on dynamic criteria between the software applications, including the monitoring agent 350, that are deposed in the containers 352 so that they are evenly divided, so that the isolated monitoring agent 350 can be affected by processing performed by other software applications. Such dynamic criteria can include, for example, a pre-assigned prioritization or balancing processing load based on storage or time.

When a monitoring agent 350 is deployed on a host 342, a new container 352 is established to execute on the host 342 and the monitoring agent is configured to operate within the container 352. The container 352 can be established on any of the hosts 342, and the monitoring agent 350 can be deployed in the container 352 regardless of the host 342 the container is deployed on, without need to reconfigure the monitoring agent 350.

Since the monitoring agent 350 is configured to operate within the container 352, the same monitoring agent 350 can be used on any of the hosts 342, without a need to reconfigure the monitoring agent 350. A single version of the monitoring agent 350 can be operated as a stand-alone monitoring agent, as a single monitoring agent on a host 342, as a tenant of a host 342 that hosts other software applications in a multitenancy configuration. Thus, a copy of the same monitoring agent 350 can be developed and deployed on different hosts 342, such that only one version of the monitoring agent 350 need be written and tested. One or more versions of the monitoring agent 350 can be created and marketed that have different capabilities, however once developed, copies of each version can be deployed on different hosts 342 or different tenancies of the same host.

The monitoring management system 310 includes a deployment dispatcher 312 and a management server 314 that execute on at least one processing device, similar to processing unit 216. The deployment dispatcher 312 and the management server 314 can be executed by the same processing device(s) or different processing device(s). The deployment dispatcher 312 can include a deployment dispatch application program interface (API) that is executed by the processing device(s) of the monitoring management system 310. The API 312 can be, for example, a RESTful API that uses Representational State Transfer (REST) that uses a coordinated set of constraints that are compatible with the hosts 342. The deployment dispatcher 312 can execute the deployment dispatcher API to receive and process a deployment request submitted by a client 320.

Processing the deployment request can include consulting host and agent database 316 to select a host 342 that is configured to operate in the region 340 specified by the deployment request. The host 342 can be selected based on information about the hosts 342, which can include, for example, availability of resources associated hosts 342 in the selected region 340. The deployment dispatcher 312 can contact the selected host 342, e.g., using an IP address or DNS name associated with the selected host 342 in the host and agent database 316, and deploy the monitoring agent 350.

The deployment can include the deployment dispatcher 312 accessing the monitoring agent 350 (or a version of the monitoring agent 350 specified in the deployment request) from the host and agent database 316 and deploying the monitoring agent 350 on the selected host 342, including installing the monitoring agent 350 by storing the monitoring agent 350 in the host's memory (e.g., RAM and/or a disk storage device) and executing the monitoring agent 350 by the host's processing device. The new instance of the monitoring agent 350 is deployed to operate within a container 352 established on the selected host 342. The deployment can further include, before installing the monitoring agent 350, establishing the container 352 on the selected host 342, including deploying the container 352 by storing a copy of the container 352 in the host's memory (e.g., RAM and/or a disk storage device). The monitoring agent 350 can begin to be executed by the host's processing device execution of the container 352 is begun by the host's processing device. \

A host selection algorithm can be used to maximize the number of deployments on the respective available hosts 342 in order to maximize the ratio of customers served per host 342. In an example, without limitation, an algorithm can include accessing a list of hosts 342 in the selected region 340 that are enabled. The algorithm can further include iterating through the hosts 342 on the list to determine which hosts 342 have not yet reached their resource limits, and selecting an enabled host 342 in the region that has the most available resources The host selection algorithm can further provision new hosts 342 when available capacity is just about to runout.

The management server 314 receives new registration information from hosts 342 that have registered to join the regions 340, and resource status update information indicating resource status and contact information (e.g., IP address or DNS name) of the respective hosts 342. The management server 314 stores the registration information and the resource status update information in the host and agent database 316 for use by the deployment dispatcher 312 when selecting a host 432. Registration and resource status updates can be performed using wired or wireless communication, such as telemetry.

The host and agent database 316 includes at least one storage device that that can be included within or external from the monitoring management system 310. The communication between the client 320 and the monitoring management system 310, as well as between the hosts 432 and the monitoring management system 310, can be wired or wireless, e.g., via a network. Similarly, communication between the deployment dispatcher 312, management server 314, and/or the host and agent database 316 can be wired or wireless, e.g., via a network.

The host machine 342 can each host multiple tenants. Each tenant can be a monitoring agent 350 that is deployed and executes in a respective controlled runtime environment, such as a container 352. Each monitoring agent 350 can be executed by the host machine's processing device using the same operating system of the host device 342 in a controlled runtime environment, e.g., provided by the containers 352, that is isolated relative to environments of other software applications.

The deployment dispatcher 312 can deploy the monitoring agents 350, e.g., by storing the monitoring agents 350 or copies of the monitoring agents 350, on one or more hosts 342 in one or more controlled runtime environments of the host(s) 342 so that the monitoring agents 350 can be executed for monitoring one or more nodes of the same network or different networks. In embodiments, modifications can be made to the copy of the monitoring agent 350 to customize the monitoring agent 350, or the copy can be identical to the monitoring agent 350.

A deployed monitoring agent 350 can communicate with the deployment dispatch server 312 to get configuration information provided by the deployment request or otherwise provided by the client (e.g., during a registration procedure). The configuration information can specify which monitoring tasks or tests to execute, which network or aspect of a network to monitor, duration of the monitoring, actions to take in response to results of the monitoring, etc.

With reference now to FIG. 4, shown is a flowchart 400 demonstrating implementation of the various exemplary embodiments. It is noted that the order of operations shown in FIG. 4 is not required, so in principle, the various operations may be performed out of the illustrated order. Also certain operations may be skipped, different operations may be added or substituted, or selected operations or groups of operations may be performed in a separate application following the embodiments described herein.

At operation 402, a deployment request sent by a client 320 is received by the deployment dispatch API. 312. The request can specify a region 340 and optionally identify a monitoring agent 350 to be deployed. At operation 404, the deployment dispatcher 312 queries the host and agent database 316 to determine a host 432 to select in the selected region 340. The deployment dispatcher 312 can use an algorithm to select a host 432 that is optimally suited for the new deployment.

At operations 406 and 408, the deployment dispatcher 312 contacts the selected host 432 and deploys the monitoring agent 350 in a controlled runtime environment, such as container 352, established on the selected host 432. Operation 406 can include storing a container 352 and the monitoring agent 350 in the host's memory. At operation 408, the execution of the container 352 and the monitoring agent 350 can begin so that the monitoring agent 350 is executed within the container 352 The monitoring agent 350 can be decommissioned, such as upon expiration of a non-renewed time period, or upon command, e.g., by the client 320, host 432, and/or deployment dispatcher 312. When the monitoring agent 350 is decommissioned, the associated container 352 can be deleted, and resources allocated to the container 352 can be reallocated to the host 342. Alternatively, the container 352 can remain where it was deployed in anticipation of deployment of a new monitoring agent 350.

In experimental procedures, users have been able to submit a request for deployment of a monitoring agent at a selected region from a user interface of a client. A monitoring agent was deployed at a location in a different continent within 30 seconds of the submission. The ability to quickly deploy a monitoring agent outside of a network assists in troubleshooting tasks by providing a point of measurement outside of the network that is displaying problems. The outside perspective provided by the deployed monitoring agent can be used to help isolate a root cause of network or application problems. Additionally, performance at different geographic locations, such as locales around the world, can be compared and marketed.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this disclosure, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

The invention claimed is:

1. A system for deploying a network monitoring agent to monitor a network, the system comprising:
   at least one first processing device configured to:
      receive a deployment request to deploy a monitoring agent on a host in a requested deployment region external from the network in which to deploy the monitoring agent, the monitoring agent including first executable instructions to monitor the network;
      query a database for a plurality of hosts provided in the requested deployment region to determine a host machine to receive the monitoring agent in the requested deployment region based upon the determined host having the greatest amount of available computing resources relative to other host machines in the requested deployment region; and
      install a container having a controlled runtime environment on the determined host machine;
      install the monitoring agent for execution within the container on the determined host machine wherein the at least one first processing device is further configured to install the container on the determined host machine and install the monitoring agent to execute in the container, the determined host machine having second executable instructions, including a single operating system, executed by a second processing device, wherein the second processing device executes the monitoring agent within the controlled runtime environment to monitor the network from an external perspective of the network, wherein in the controlled runtime environment, during execution of the monitoring agent, all areas of the operating system that are writable by the monitoring agent are isolated from areas of the operating system that are writable by any other software application being executed by the second processing device using the operating system, wherein isolation is provided between the monitoring agent and software applications providing exclusive use of host resources whereby the isolated monitoring agent does not share resources with software applications executing on the host.

2. The system of claim 1, wherein in the controlled runtime environment, an area of the operating system that is read-only is shared with one of the other software applications.

3. The system of claim 1, wherein the at least one first processing device is configured to select the host machine from a plurality of host machines available in the specified region based on availability of resources on the respective plurality of host machines.

4. The system of claim 3, wherein the at least one first processing device is further configured to receive updates from the plurality of host machines regarding availability of resources on the respective host machines.

5. The system of claim 1, wherein the at least one first processing device is further configured to install and execute an unmodified copy of the monitoring agent for execution by a third processing device of a second host machine in a controlled runtime environment to monitor at least one of the network or a different network.

6. The system of claim 1, wherein the container is a cloud-based container.

7. The system of claim 1, wherein the container operates in a virtual environment.

8. The system of claim 1, wherein the host machine operates in a virtual environment.

* * * * *